REGISTER CIRCUIT

Filed Aug. 31, 1950

INVENTOR
T. L. DIMOND
BY J. W. Schmied
ATTORNEY

Patented Jan. 15, 1952 2,582,480

UNITED STATES PATENT OFFICE 2,582,480

REGISTER CIRCUIT

Thomas L. Dimond, Rutherford, N. J., assignor to Bell Telephone Laboratories, Incorporated, New York, N. Y., a corporation of New York Application August 31, 1950, Serial No. 182,492

6 Claims. (Cl. 315—227)

This invention relates to circuit arrangements for storing electrical energy and in particular to circuits which are adapted to store electrical energy in response to momentarily applied signaling conditions, said circuits being capable of subsequently discharging said stored energy so that the prior presence and polarity of the applied signaling conditions can be ascertained.

In telephone switching systems, electronic computers, and other information systems known in the prior art, it is often necessary or desirable to store information for a relatively short period before subsequently using said information in the system. For example, in a crossbar telephone system the calling line location information is supplied to an originating register when a marker connects the register to the calling line. This information is stored by the register during subscriber dialing and is subsequently furnished to a marker when the register requests the marker to set up a connection from the calling line to a trunk circuit. This information is stored by relays whose energized and unenergized combinations represent values in a digital code group which identifies the calling line.

Various other circuit arrangements have been used for storing information until subsequent use thereof. In United States Patent 2,126,875, granted August 16, 1938, to T. L. Dimond, storage circuit arrangements employing gas diodes with series resistors connected thereto were disclosed cooperating with a telephone sender circuit for controlling the setting of telephone selector switches in accordance with particular digit registrations. Although this storage circuit was well suited for the purpose for which it was designed, the gas diodes had a relatively short tube life inasmuch as it was a necessary requirement of the circuit that the tubes remain ionized during the storage time interval. Furthermore, as this time interval in some instances was rather long, a power supply source capable of supplying large currents was necessary.

Another storage circuit arrangement which has been used in the prior art employs capacitors for storing electrical energy representing information. However, the conductors leading to the capacitors and the relay contact combinations which were connected to these capacitors presented relatively low resistance leakage paths to said capacitors thereby causing a change or mutilation of the stored information after a short period of time. An estimate of the value of the leakage resistance in the above-mentioned type of storage circuit is approximately 10 megohms.

Leakage in the capacitors themselves is not an important factor because capacitors are readily manufactured with leakage resistances of the order of 2,000 megohms per microfarad which represents a time constant of 2,000 seconds.

Accordingly, it is an object and feature of this invention to employ capacitors as storage elements in an improved storage circuit wherein a longer discharge time constant is presented to the storage capacitors by the circuit connections thereto during the information storage interval. In the attainment of this object a storage unit is employed which can be placed in a shielded container for replacement convenience and also to diminish the possibility of the circuit environment discharging the storage capacitor by presenting a low resistance leakage path thereto. A gas diode tube is connected directly in series with a storage capacitor and the combination thereof is sealed in said container with an insulated conductor feeding through the container and being connected internally to one of the electrodes of said diode for making external connections to the storage unit, the other connection being to the container to which one terminal of the storage capacitor is connected. With such an arrangement the discharge circuit presented to the storage capacitor includes the gas diode tube space path and when said tube is in a deionized state the discharge time constant is extremely long thereby enabling the storage unit to store information for a long period of time.

Another object of this invention is a storage circuit of improved stability.

Another object of this invention is a storage circuit which utilizes no energy from a power supply source during the storage interval.

Another object of this invention is a circuit arrangement capable of storing positive or negative impulses until subsequent operation of a reader circuit which is responsive to impulses of a particular polarity. In accordance therewith impulses of different polarity can be stored one at a time in the same storage circuit without a change of any circuit connections thereof. Such an arrangement is advantageous in that the same type replacement storage unit can be used interchangeably in apparatus requiring storage of one type of impulses, either positive or negative, or in apparatus requiring storage of both positive and negative impulses as transmitted by a particular information system.

In order that the invention may be clearly understood and readily carried into effect it will now be fully described with reference to the accompanying drawings, in which.

Figure 1:
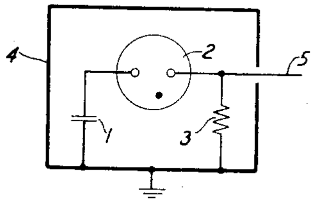
Fig. 1 shows the storage circuit of this invention enclosed within a shielding container so as to comprise a single unit.

In Fig. 1 storage capacitor 1 is connected between ground and one of the electrodes of diode 2. Resistor 3 is connected between ground and input-output conductor 5. This capacitor-resistor-diode tube subcombination is shielded within container 4 and comprises the storage unit of this invention. Container 4 is preferably constructed of a metal such as aluminum or copper which is suitable for electromagnetic and electrostatic shielding. Conductor 5 should be insulated from container 4 by any insulating means known in the prior art of high resistivity. Diode 2 is a cold cathode gas tube which conducts in either space path direction with the application of a positive or negative breakdown potential to a given electrode with respect to the other electrode of said diode. Diode 2 should preferably have an extremely high leakage resistance between electrodes when deionized. The conductor connecting capacitor 1 to diode 2 should be insulated from ground by any extremely high resistance means or arrangement known in the prior art.

To initiate operation of the storage unit a positive or negative impulse is applied between conductor 5 and ground. The amplitude of said impulse should be great enough to break down and fully ionize diode 2. After capacitor 1 has charged to a value which, when subtracted from the applied potential, leaves a resulting potential across the diode less than the gaseous space path sustaining value, diode 2 will be extinguished, leaving capacitor 1 with a charge therein and a potential thereacross. This potential will remain substantially constant for a long time interval because any discharge path presented to capacitor 1 includes the extremely high resistance of the now deionized diode 2 space path. With proper selection of circuit components capacitor 1 can maintain its charge for several minutes or more. The plate of capacitor 1 which is directly connected to an electrode of diode 2 will assume a positive or negative potential depending upon the positive or negative potential, respectively, of conductor 5 with respect to ground during the charging interval. The value of resistor 3 is not extremely critical. It should preferably have the greatest resistance value possible that will give conductor 5 a definite or fixed potential with respect to ground when diode 2 is extinguished but still not permit said conductor to "float" potentialwise.

The components of Fig. 1 can be placed in a shielding container so that the storage unit will be easily removable when installed in particular system apparatus thereby providing for replacement by another unit when necessary by a simple substitution operation. However, it is to be understood that it is not necessary to construct the storage circuit of this invention in a container in order to accomplish its storage functions. Notwithstanding, it is preferable to enclose the storage unit within a container so as to assure an extremely high resistance leakage path between the conductor which connects capacitor 1 to diode 2 and ground; otherwise, in different circuit applications the different environment created by haphazard circuit arrangements could possibly present a low resistance discharge path to capacitor 1.

Figure 2:
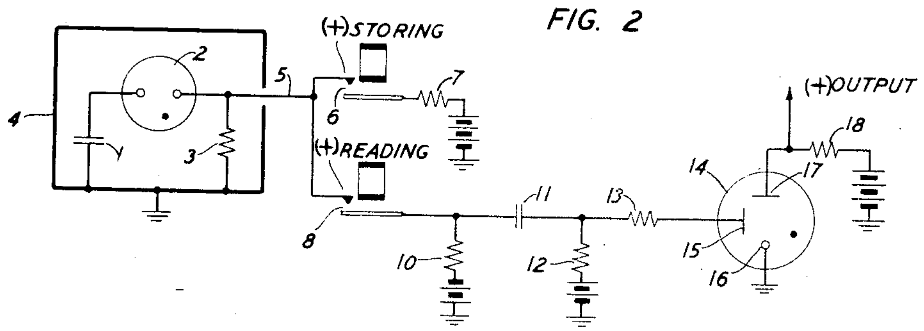
Fig. 2 shows the storage unit of Fig. 1 cooperating with a reading circuit arrangement for utilizing stored positive electrical impulses.

In Fig. 2 a storage unit identical to that of Fig. 1 is shown cooperating with a circuit arrangement for reading positive stored impulses. When the prior presence of an impulse is to be ascertained a reading tube is caused to break down by discharging the energy of the storage unit through an appropriate circuit to which the starter space path of said reading tube is connected. In particular, to store information which is to be subsequently read, contact 6 is momentarily closed by an associated electrical circuit or by manual operation thereof and a positive potential is applied to diode 2 through a circuit which includes resistor 7, contact 6, conductor 5, diode 2 and capacitor 1. When information storage is to occur, in the usual case, capacitor 1 will have no energy or insufficient energy stored therein to assume a potential sufficient to break down diode 2. Therefore, a requirement is specified that the positive potential source have a potential sufficiently great to break down diode 2. When diode 2 is broken down capacitor 1 will begin to charge until the potential appearing across said capacitor, subtracted from the potential of the positive source, is less than the sustaining potential required for diode 2. With this condition, diode 2 will be extinguished and capacitor 1 will remain in a charged state. The storage efficiency of this circuit depends, of course, upon having an extremely long discharge time constant in the time interval during which capacitor 1 is to store energy; consequently, diode 2 should be selected so as to have an extremely large leakage resistance when said diode is in a deionized state.

When it is required to ascertain the prior presence of a stored impulse contact 8 is closed by an associated electrical circuit or by manual operation thereof, contact 6 having been opened by this time, and diode 2 is again ionized by a total potential which comprises the potential across capacitor 1 in series with the negative potential applied to resistor 10. The maximum negative potential applied to resistor 10 should be less than the breakdown value required to ionize diode 2, otherwise diode 2 will ionize irrespective of the potential of capacitor 1. It should be noted that the potentials of the storage capacitor and the negative potential source aid each other and the sum thereof should exceed the breakdown potential for diode 2. When diode 2 ionizes after the closing of contact 8, a potential drop occurs across resistor 10 with such a polarity that the potential of the plate of capacitor 11 connected to starter anode 15 through resistor 13 is immediately increased in a positive direction with respect to ground. The amplitude of this potential increase should be great enough to break down the starter space path 15—16. When reading tube 14 is not required to read, contact 8 being open, the starter anode 15 is biased by a positive potential applied through a circuit connection which includes resistors 12 and 13, said potential being less than the positive potential necessary to ionize said starter space path. However, when tube 14 is required to read a stored signal, a slight increase in positive potential is applied to the starter anode through capactior 11 by the voltage drop across resistor 10 due to the breakdown of diode 2 thereby ionizing said starter space path 15—16. The maximum current which will flow through said space path is limited by resistor 13. When this current is sufficiently large the ionization transfers to the main space path 16—17, thereby causing a current impulse to be developed across resistor 18. Said impulse may be coupled by connecting the output conductor to any circuit well known in the art which is responsive thereto so as to accomplish a required circuit function.

With the arrangement hereinbefore described a positive impulse which is stored by momentarily closing contact 6 may be subsequently read by closing contact 8 as an impulse will appear between the output conductor and ground in response to the closing of contact 8. If an impulse was not stored in the storage unit by a prior closing of contact 6, closure of contact 8 will not operate reader tube 14 so as to produce an output potential because the necessary positive impulse to produce ionization in the starter space path 15—16 will not appear across resistor 10 as diode 2 will ionize only when capacitor 1 is charged and a series aiding potential is applied therewith from the negative supply source so that the potential sum thereof exceeds the breakdown value of diode 2. To prevent a false reading operation after an impulse has been stored in capacitor 1 and subsequently read by closure of contact 8, the voltage of the negative supply source connected to resistor 10 should preferably be selected so that after the proper reading operation has occurred and diode 2 is deionized the charge remaining in capacitor 1 is negligible and the potential appearing thereacross is approproximately zero. If a substantial potential remains across capacitor 1 after a reading operation, a false reading operation might occur subsequently inasmuch as the potential of the negative supply source connected to resistor 10 plus the residual potential across capacitor 1 might be sufficient to ionize diode 2 without a storage operation having been made by closure of contact 6.

Figure 3:
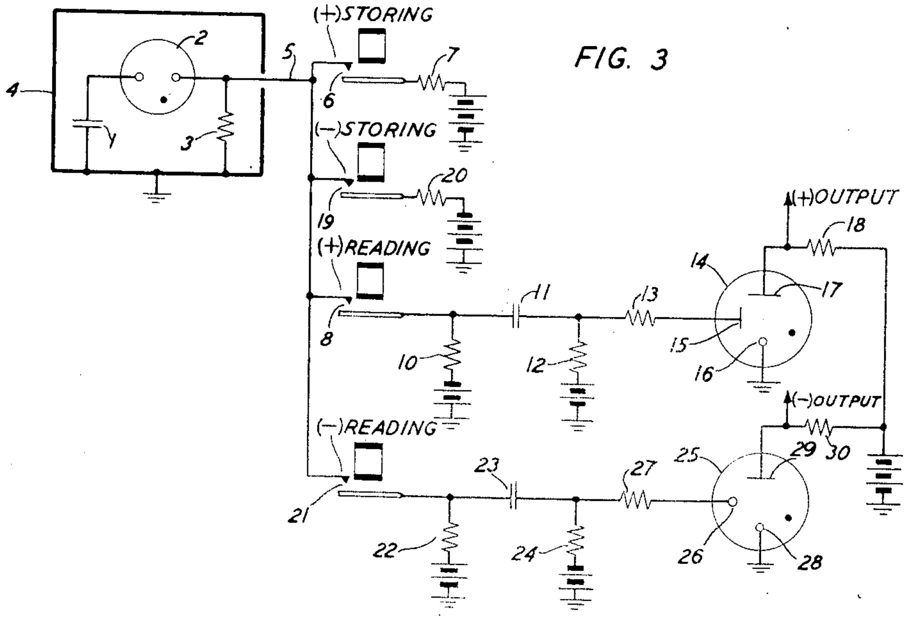
Fig. 3 shows the storage unit of Fig. 1 cooperating with a reading circuit arrangement for utilizing stored positive or negative impulses.

In Fig. 3 the storage circuit of Fig. 1 is again shown in a circuit arrangement for storing positive impulses and subsequently reading said positive impulses. However, in addition thereto the storage unit is connected to a charging circuit which will charge capacitor 1 to a negative potential value with respect to ground. Said charging circuit comprises diode 2, conductor 5, contact 19, resistor 20 and the negative potential source connected to resistor 20. It should be noted that the charging potential source in this case is opposite in polarity with respect to ground to that of the circuit of Fig. 2 or the duplicate thereof incorporated in Fig. 3 which stores and reads positive impulses.

When contact 19 is closed by an associated electrical circuit or by manual operation thereof, the negative potential source ionizes diode 2 and charges capacitor 1. The plate of the capacitor connected to the electrode of diode 2 now assumes a negative potential with respect to ground. When the potential across said capacitor, subtracted from the potential of the negative source, is less than the sustaining value required for diode 2, said tube will become extinguished. In this case if it is desired to read said stored impulse, closure of contact 8 will not ionize diode 2 as the positive potential applied through resistor 10 opposes the potential of capacitor 1. Closure of contact 21 on the other hand adds the positive potential of the source connected to resistor 22 to the potential of capacitor 1 and diode 2 is thereby ionized. When conduction begins in diode 2, a negative potential impulse is developed across resistor 22 with respect to ground and said impulse is coupled by capacitor 23 to the starting space path 26—28 of reading tube 25. This negative impulse is applied through capacitor 23 so as to make more negative the negative bias applied to cathode 26 through resistors 24 and 27 thereby ionizing starter space path 26—28. When the current density in the starter space path 26—28 reaches the transfer value ionization ultimately transfers to the main space path 28—29 and a current impulse is developed across resistor 30. This impulse may be coupled by circuit means well known in the art to circuit arrangements which are responsive to said impulse by making a connection to the negative output conductor.

Although the storage and reading operations of the circuits of Figs. 2 and 3 are disclosed as being controlled by contact arrangements which may be operated by an opening and closing force, it is obvious that the contacts may be actuated by any electrical and/or electronic means known in the art which may be adapted therefor or said contact arrangements may be manually operated. Furthermore, it is also obvious that the impulses appearing across resistors 10 and 22, when the storage unit containing information therein is to be read, may be utilized by arrangements well known in the art other than the reader tube circuits disclosed herein. It is to be understood, therefore, that the above-described arrangements are illustrative of the applications of the principles of this invention and numerous other arrangements may be devised by those skilled in the art without departing from the scope of the invention.

What is claimed is:

1. An information storing circuit comprising a bilaterally conducting gaseous diode and a storage capacitor connected in series therewith, a potential source for initially applying a breakdown potential to said series diode-capacitor subcombination thereby charging said capacitor until the absolute value of said breakdown potential subtracted from the absolute value of the potential across said storage capacitor is less than the sustaining potential of said diode, an impedance element, a second potential source for subsequently applying to said series diode-capacitor subcombination through said impedance element a potential less in value and opposite in polarity with respect to said breakdown potential thereby ionizing said diode and creating a current flow through said impedance element, and output means connected to said impedance element and responsive to the current flow through said impedance element.

2. An information storing circuit comprising a gaseous diode and a storage capacitor connected in series therewith, a potential source for initially applying a potential to said series diode-capacitor subcombination to ionize said diode until said capacitor charges to a potential value which reduces the potential applied to said diode to a value below the sustaining value thereof thereby extinguishing said diode, and a second potential source for subsequently applying to said series diode-charged capacitor subcombination a potential which when added to the potential of said charged capacitor again ionizes said diode.

3. An information storing circuit comprising a bilaterally conducting cold cathode gaseous diode tube and a storage capacitor in series therewith, a source for initially applying a potential to said series diode-capacitor subcombination so as to ionize said diode until said capacitor charges to a potential value which reduces the potential applied to said diode to a value below the sustaining value thereof, and means for subsequently applying to said series diode-capacitor subcombination a potential which is series aiding to the potential appearing across said capacitor so as to again ionize said diode.

4. An information storing circuit comprising a bilaterally conducting cold cathode gaseous diode tube and a storage capacitor in series therewith, means for initially applying a potential to said series diode-capacitor subcombination so as to ionize said diode until said capacitor charges to a potential value which reduces the potential applied to said diode to a value below the sustaining value thereof, means for subsequently applying to said series diode-capacitor subcombination a potential which is series aiding to the potential appearing across said capacitor so as to again ionize said diode, and output means connected to said diode-capacitor subcombination.

5. In a circuit for ascertaining the prior presence of an electrical impulse, comprising a capacitor, an electron discharge device having a gaseous space path therein, a first potential source, means for momentarily connecting said capacitor, discharge device and first potential source in series so as to ionize said space path and thereby charge said capacitor until said space path deionizes, and means for applying a second potential in series with that of the charged capacitor so that the sum thereof will again ionize said space path and discharge said capacitor.

6. A method for ascertaining the prior presence and polarity of an electrical charge comprising, first, charging a capacitor to a potential value, second, discharging said capacitor through a gaseous space path having a breakdown potential greater than the capacitor potential by applying a series aiding potential to said capacitor potential so that the sum thereof exceeds the gaseous space path breakdown potential.

THOMAS L. DIMOND.

No references cited.